United States Patent
Ayers (10) Patent No.: US 8,734,175 B2
(45) Date of Patent: May 27, 2014

(54) FLEXIBLE SEALING CONNECTOR

(75) Inventor: David Blaine Ayers, Sugar Land, TX (US)

(73) Assignee: Sondex Wireline Limited (GB)

( * ) Notice: Subject to any disclaimer, the term of this patent is extended or adjusted under 35 U.S.C. 154(b) by 21 days.

(21) Appl. No.: 13/301,369

(22) Filed: Nov. 21, 2011

(65) Prior Publication Data

US 2013/0130529 A1    May 23, 2013

(51) Int. Cl.
    *H01R 13/52*    (2006.01)
(52) U.S. Cl.
    USPC ............................................. 439/271
(58) Field of Classification Search
    USPC ......... 439/271–275, 278–284, 587, 589, 604, 439/230; 174/77 R, 84 R, 153 G
    See application file for complete search history.

(56) References Cited

U.S. PATENT DOCUMENTS

| | | | |
|---|---|---|---|
| 3,871,735 A * | 3/1975 | Herrmann, Jr. ............... 439/585 |
| 4,074,926 A * | 2/1978 | Broad .............................. 439/89 |
| 4,986,764 A * | 1/1991 | Eaby et al. ..................... 439/275 |
| 5,908,332 A * | 6/1999 | Varreng et al. ............ 439/607.58 |
| 6,676,447 B1 | 1/2004 | Knox |
| 7,195,505 B1 * | 3/2007 | Becker .......................... 439/282 |
| 7,355,122 B2 * | 4/2008 | Moore ........................ 174/84 R |
| 7,618,287 B2 | 11/2009 | Hass |
| 7,674,124 B2 | 3/2010 | Nicholson |
| 2008/0132115 A1 | 6/2008 | Jackson et al. |

* cited by examiner

*Primary Examiner* — Edwin A. Leon
*Assistant Examiner* — Harshad Patel
(74) *Attorney, Agent, or Firm* — Crowe & Dunlevy (57) ABSTRACT

A flexible sealing connector for conveying an electrical signal from a first tool portion to a second tool portion, at least one of the first tool portion and the second tool portion having a receiver with a surface defining a receiver passageway, includes a deformable boot in sealing engagement with the surface of the receiver passageway, the deformable boot having a surface defining a boot passageway. The connector further includes an electrical coupler in sealing engagement with the surface of the boot passageway, the coupler having a first end electrically connected to a first electrical line extending from the first tool portion and a second end electrically connected to a second electrical line extending from the second tool portion whereby the first line and the second line are electrically connected, the receiver passageway is sealed by the boot and the boot passageway is sealed by the coupler.

16 Claims, 5 Drawing Sheets

FLEXIBLE SEALING CONNECTOR

BACKGROUND

1. Technical Field

Embodiments of the subject matter disclosed herein generally relate to sealing electrical connectors, and more particularly, to a sealing electrical connector between a first down hole tool portion and a second down hole tool portion of an oil well survey tool.

2. Discussion of the Background

Down hole survey tool strings are made up of a series of discrete tool portions which are connected together as the survey tool is advanced into the ground. Feed through connectors are employed to facilitate the delivery of an electrical signal from one tool portion to the next without allowing high pressure fluid to enter the string at the connection between adjacent tool portions.

Figure 11:
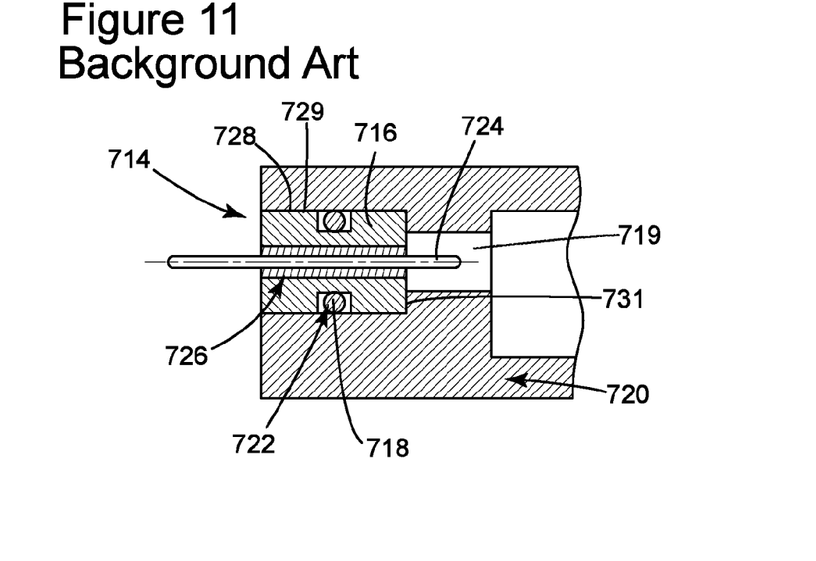
FIG. 11 depicts a connector.

FIG. 11 shows a typical feed through connector 714 seated in a tool portion 720. Feed through connector 714 includes a body 716 having a channel 718 for an O-ring 722. The O-ring 722 seals between the connector body 716 and a seat 728 in the tool portion 720. Connector 714 further includes a contact pin 724 and a glass insulator 726 between the contact pin 724 and the body 716. During fabrication of the connector 714, the glass insulator 726 is melted into place to provide a seal between the contact pin 724 and the body 716.

Although not shown, a first line from a first down hole tool portion connects to the down hole end of the contact pin 724 and a second line from a second tool portion connects to the other end of the contact pin 724. During use, high pressure fluid in the down hole environment (to the left of pin 724 in FIG. 11) is prevented from penetrating into the internal area (to the right of pin 724 in FIG. 11) of tool portion 720 by O-ring 718 and glass insulator 726.

Figure 12:
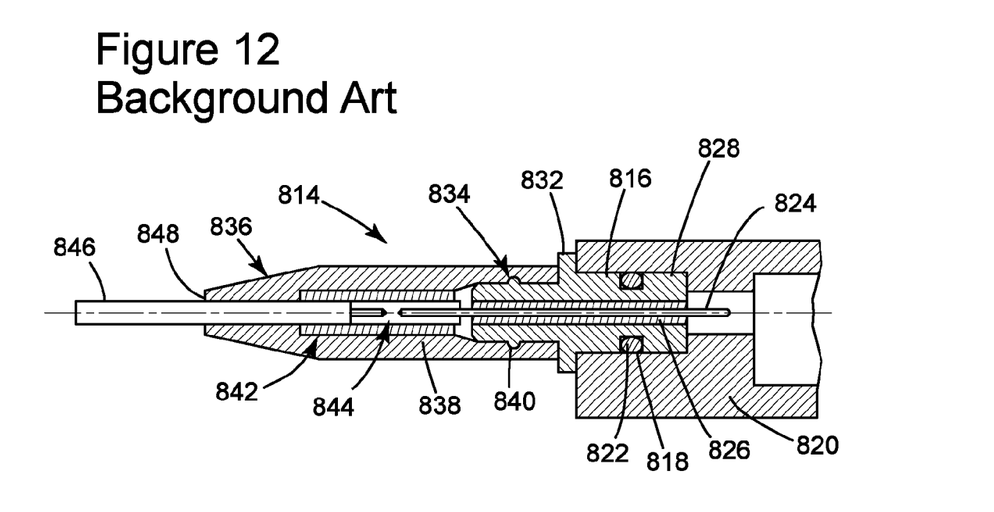
FIG. 12 depicts another connector.

FIG. 12 shows another feed through connector 814. Connector 814 represents a type of connector such as is manufactured by Kemlon Products Company of Houston, Tex. and includes a connector body 816 having a channel 818 for an O-ring 822. Although not shown, body 816 and seat 828 may include threads for connecting body 814 to tool portion 820. A contact pin 824 extends through the body 816 and a glass insulator 826 seals between contact pin 824 and body 816. Body 816 also includes a flange 832 and a ridge 834. In another embodiment (not shown), body 816 is made of polyether ether ketone (PEEK) which is molded around contact pin 824.

Connector 814 further includes a slip-on boot assembly 836 including a rubber boot 838 and a radial groove 840, an insulating sleeve 842, and a socket connector 844. Rubber boot 838 and insulating sleeve 842 are slipped over insulated wire 846. The hole 848 in the end of the rubber boot is sized slightly smaller than the outside diameter of the insulated wire 846 to compress onto the wire to provide a low pressure seal. The end of the insulated wire 846 is then stripped of insulation to allow the wire to be soldered into one end of the socket connector 844. Insulating sleeve 842 is then slid over socket connector 844 and rubber boot 838 is slid over sleeve 842 to complete the assembly of boot assembly 836.

The boot assembly 836 is then pushed onto connector 814 causing the free end of socket connector 844 to engage contact pin 824 and radial groove 840 to engage ridge 834. In use, pressure in the down hole environment increases the sealing force of rubber boot 838 against wire 846 and ridge 834 by contact of surfaces of hole 848 and groove 840, respectively.

One problem associated with connector 714 (FIG. 11) is that contact pin 724 extends outwardly from both ends of glass insulator 726. This renders the pin exposed and prone to damage, for example, during contact with components, tools, personnel, etc., or as another example, during operation of the survey tool due to, for example, vibration of the string. Potential damage to pin 724 is aggravated by the dimensions of the pin itself, i.e., the pin is elongated and has a small diameter. The pin is also rendered more vulnerable to damage by the other components of connector 714 in that there is a general lack of shock absorption or cushioning available due, in part, to the rigidity of the pin itself and the brittle nature of the glass insulator 726 and body 716.

As may be appreciated from FIG. 12, connector 814 extends outwardly from the end of tool portion 820 farther than pin 724 and is thus also prone to damage. Further, note that pin 824 is longer than pin 724 and extends even further from tool portion 820 than pin 724 extends from tool portion 720. Thus, pin 824 is even more prone to damage than pin 724.

Moreover, because boot assembly 836 extends outwardly from body 816, space for this assembly must be provided in the adjacent tool portion. The extra machining necessary to create this space is both difficult and expensive. And, the removal of material to accommodate the assembly weakens the tool portions. Further, the extra parts in boot assembly 814 add complexity, increase costs, and present further opportunities for problems to occur during assembly and operation of a survey tool incorporating such parts.

Accordingly, there is a need for an electrical connector that is simple, easy to use, operates with less parts, requires less space, utilizes components that are less brittle, and which is less prone to damage. Moreover, there is a need for an improved sealing connector capable of use between down hole tool portions in an environment having an ambient pressure greater than atmospheric pressure.

SUMMARY

According to an exemplary embodiment a flexible sealing connector for conveying an electrical signal from a first tool portion to a second tool portion at least one of the first tool portion and the second tool portion having a receiver with a surface defining a receiver passageway includes a deformable boot in sealing engagement with the surface of the receiver passageway, the deformable boot having a surface defining a boot passageway. The connector further includes an electrical coupler in sealing engagement with the surface of the boot passageway, the coupler having a first end electrically connected to a first electrical line extending from the first tool portion and a second end electrically connected to a second electrical line extending from the second tool portion whereby the first line and the second line are electrically connected, the receiver passageway is sealed by the boot and the boot passageway is sealed by the coupler.

According to another exemplary embodiment, a sealed electrical connector assembly for a well logging tool includes a first tool portion including a first electrical line extending from an end thereof and a second tool portion including a second electrical line extending from an end thereof. The at least one of the first and second down hole portions including a seat, the seat having a surface defining a seat passageway. The assembly further includes a receiver in sealing engagement with the surface of the seat passageway, the receiver having a surface defining a receiver passageway, a deformable boot in sealing engagement with the surface of the receiver passageway, the deformable boot having a surface defining a boot passageway. The assembly further includes an electrical coupler in sealing engagement with the surface of the boot passageway, the coupler having a first end electrically connected to the first electrical line and a second end electrically connected to the second electrical line whereby the first line and the second line are electrically connected, the seat passageway is sealed by the receiver, the receiver passageway is sealed by the boot and the boot passageway is sealed by the coupler.

According to another exemplary embodiment a method of providing a retrofit for a sealed electrical connector between a first down hole tool portion and a second down hole tool portion, at least one of the first down hole tool portion and the second down hole portion including a seat having a surface defining a seat passageway between the first down hole tool portion and the second down hole portion includes providing a receiver configured to sealingly engage the surface of the seat passageway, the receiver having a surface defining a receiver passageway. The method further includes providing a deformable boot configured to sealingly engage the surface of the receiver passageway, the deformable boot having a surface defining a boot passageway and also providing an electrical coupler configured to sealingly engage the surface of the boot passageway, the coupler having an end configured to electrically connect to a first line extending from the first down hole tool portion and another end configured to electrically connect to a second line extending from the second down hole tool portion.

Benefits and advantages of exemplary embodiments include (but are not limited to) a decrease in the space necessary to effect a seal and provide an electrical connection between tool portions, an increase in stress relief to the components of a connector, a decrease in costs of production and replacement, a reduced necessity for machining between tool portions or an improvement in the geometry of the machining, i.e., less weakening, an increase in control and customization of seal performance, an increase in resistance to damage, and other benefits and advantages.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of down hole survey tools or well logging systems. However, the embodiments to be discussed next are not limited to these exemplary systems, but may be applied to other systems.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
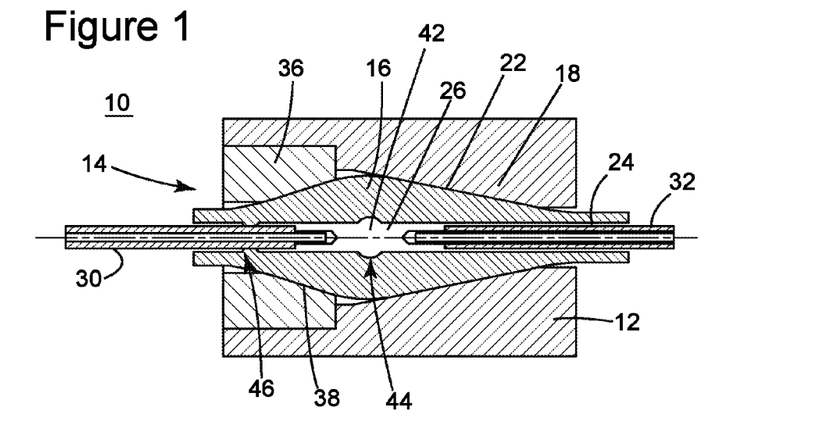
FIG. 1 is a cross-sectional view of a flexible sealing connector according to an exemplary embodiment.
Figure 2:
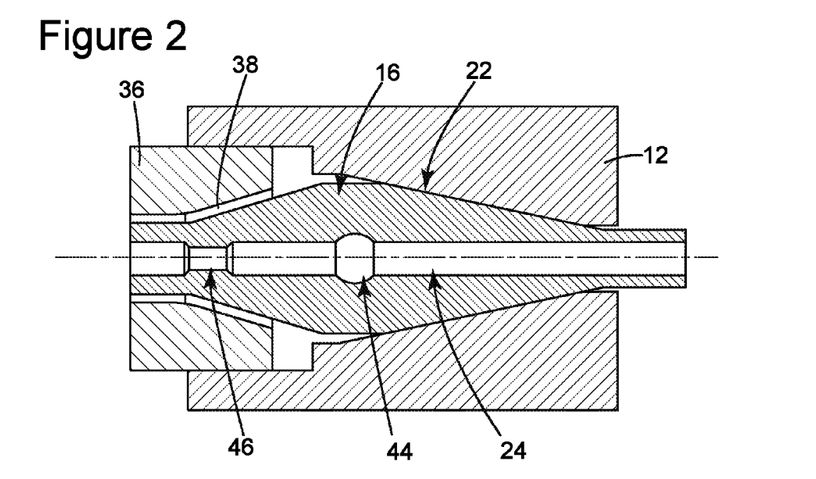
FIG. 2 is a partial cross sectional view of the connector according to the exemplary embodiment shown in FIG. 1.
Figure 3:
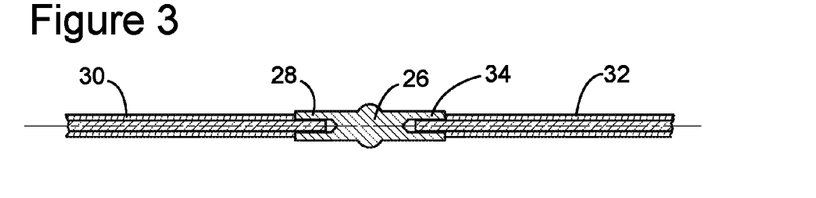
FIG. 3 is a partial cross-sectional view of the connector according to the exemplary embodiment shown in FIG. 1.

FIGS. 1 to 3 show an exemplary embodiment of a flexible sealing connector 14 according to the present invention. As shown in FIG. 1, connector 14 is installed in a down hole tool 10 having a first tool portion (not shown) and a second tool portion 12. Second tool portion 12 includes a receiver portion 18 having a surface defining a receiver passageway 22. Receiver portion 18 may be integral with second tool portion 12 or, as will be discussed further below, may be a separate component which is detachable from second tool portion 12.

As shown in FIGS. 1 and 2, connector 14 includes a deformable boot 16 in sealing engagement with the surface of receiver passageway 22. Exemplary materials for deformable boot 16 include natural or synthetic materials which have elastic or plastic deformation properties, such as rubber, reinforced plastic, etc. Boot 16 has a surface defining a boot passageway 24. Connector 14 further includes an electrical coupler 26 in sealing engagement with the surface of boot passageway 24 as shown in FIG. 1.

Electrical coupler 26 includes a first end 28 (FIG. 3) electrically connected to a first electrical line 30 extending from the first tool portion (not shown) and a second end 34 (FIG. 3) electrically connected to a second electrical line 32 extending from the second tool portion 12. As shown in FIGS. 1 and 3, the first end 28 and the second end 34 of the coupler each include a socket in which a stripped end portion of the first electrical line 30 and second electrical line 32, respectively, is soldered or crimped. Electrical coupler 26 allows electricity to flow between first electric line 30 and second electric line 34.

Connector 14 is exposed to the environment on the left side of the tool portion 12 shown in FIG. 1. The environment may include water or drilling mud at non-atmospheric pressure. The area to the right side of tool portion 12 in FIG. 1 represents the interior of tool portion 12 which may be at atmospheric pressure. The sealing engagement between boot 16 and the surface of receiver passageway 22 as well as the sealing engagement between coupler 26 and boot passageway 24 function to seal the receiver passageway 22 and the boot passageway 24 thereby preventing exposure of the interior of second tool portion 12 from the aforementioned environment.

In the embodiment shown in FIGS. 1 and 2, the sealing engagement between boot 16 and receiver passageway 22 is effected at least in part by the static friction between boot 16 and the surface of receiver passageway 22 and in part by the static friction of coupler 26 against the surface of boot passageway 24. It is important to note that sealing engagement between components may include providing additional structure or features between components which seal against each other. Sealing engagement may include, for example, surface textures, adhesives, sleeves, ridges, or other features or structure which improve sealing engagement or otherwise improve the performance of connector 14.

As further shown in FIGS. 1 and 2, boot 16 and the surface of the passageway 22 taper towards tool portion 12. This arrangement allows flexible boot 16 to be "wedged" into place against the surface of passageway 22 during assembly and may obviate the need for any additional structure or feature directed to holding boot 16 in sealing engagement with receiver passageway 22. Also note that during use, the ambient down hole pressure may act against connector 14 to further force and compress boot 16 against passageway 22 thereby further increasing the sealing force not only between boot 16 and receiver passageway 22 but also between coupler 26 and boot passageway 24.

In the exemplary embodiment of FIGS. 1-3, connector 14 also includes an optional retainer 36 for retaining boot 16 in sealing engagement with the surface of receiver passageway 22. Retainer 36 may connect to second tool portion mechanically, for example, by a threaded or interference fit type of connection, or chemically, for example, by an adhesive or a welding type of connection. Alternatively, a separate fastener may be used to selectively maintain retainer 36 connected to tool portion 12.

In the embodiment shown in FIGS. 1-2, retainer 36 is a separate component from boot 16, however, retainer 36 and boot 16 may be integrally formed as a single component. As further shown in FIG. 1, retainer 36 is sealingly engaged with receiver passageway 22. Further, retainer 36 includes a retainer passageway 38 and as shown in FIG. 1, boot 16 is in sealing engagement with the surface of retainer passageway 38. Both boot 16 and retainer passageway 38 taper towards the first tool portion. This taper allows for retainer 36 to apply a preload against boot 16. Thus, in addition to the initial frictional engagement between boot 16 and receiver passageway 22, further sealing force between boot 16 and receiver passageway 22 may be provided by the contact of retainer 36 with boot 16. This preload may also enhance the sealing force between retainer 36 and boot 16. It should further be noted that the compression of boot 16 between receiver passageway 22 and retainer 36 may also enhance the sealing engagement between coupler 26 and boot passageway 24. Moreover, the connector 14 may be configured such that pressure communicated to the entire left hand outer conical surface (FIGS. 1 and 2) of boot 16 will provide greater sealing force between boot 16 and receiver passageway 22.

In this regard, note that in the exemplary embodiment of FIGS. 1-3, coupler 26 includes a ridge 42 in sealing engagement with a groove 44 in boot passageway 24. Ridge 42 and groove 44 are disposed in connector 14 between the taper of the boot 16 towards the first tool portion (not shown) and the taper of the boot 16 towards the second tool portion 12. As may be appreciated from FIG. 1, this feature may deter movement and enhance the seal between coupler 26 and boot 16. Specifically, since ridge 42 and groove 44 are substantially congruous with the first and second tapers in the boot 16, the force exerted by retainer 36 and receiver 18 against boot may include components which increase the sealing force between boot 16 and coupler 26. These force components may be further configured by, for example, altering the geometry of ridge 42 and groove 44. For example, instead of defining a toroidal shape, ridge 42 and corresponding groove 44 may define a cylindrical, square, or other shape. Further, multiple ridges and grooves may also be provided.

Characteristics of the sealing provided by connector 14 may also be configured by varying the taper towards the first or second tool sections. In the embodiment shown in FIGS. 1-2, the retainer passageway 38 and the boot 16 have a conical taper with an angle towards the first tool portion which is greater than the conical taper angle of receiver passageway 22 and boot 16 towards the second tool portion. It is important to note that these taper angles may be adjusted to achieve a desired performance of connector 14. For example, the tapers may have profiles other than conical, for example, each taper may have a convex, or concave profile. Or, as another example, each taper may include multiple profiles to provide sequential or multistage sealing of the boot 16 to the receiver passageway 22 or the retainer passageway 38.

As shown in FIGS. 1 and 3, first electrical line 30 extends from the first tool portion (not shown) into boot passageway 24 to the first end of coupler 26 and second electrical line 32 extends from second tool portion 12 into an opposite end of boot passageway 24 to the second end of coupler 26. The surface of boot passageway 24 is configured to engage first line 30 and second line 32 to provide strain relief to coupler 26. Specifically, the surface of boot passageway 24 may engage line 30 or line 32 during tension, compaction, bending, or other force applied to line 30 or 32 in order to resist such force and otherwise protect the connection of line 30 or line 32 with coupler 26.

As further shown in FIG. 1, the surface of boot passageway 34 defines a throttle portion 46 in sealing engagement with first line 32. As discussed above, connector 14 is exposed to the environment on the left side of tool portion 12. Throttle 46 resists the penetration of the environment into the area occupied by the connection of coupler 26 with first line 30 thereby preventing corrosion and potential malfunction of connector 14. The surface of boot passageway 24 may also include a throttle portion in sealing engagement with second line 32. As further discussed below, throttle 46 may be configured to compress against first line 30 as pressure increases to further resist or prevent fluid invasion.

Assembly of the exemplary connector 14 shown in FIG. 1 may involve feeding first line 30 through retainer 36 and boot passageway 22 and then connecting the end of first line 30 and the end of second line 32 to opposite ends of coupler 26, for example, by soldering or crimping. Boot 16 may then be slid along first line 32 until coupler 16 enters boot passageway and ridge 42 engages groove 44. The engagement of ridge 42 with groove 44 may provide a tactile indication that the sealing engagement of coupler 26 with boot 16 is complete. The connector 14 is then engaged with the surface of receiver passageway 22 of second tool portion 12. Specifically, second line 32 is fed past the end of receiver passageway 22 to the interior of second tool portion 12. The portion of boot 16 which tapers towards the second tool portion 12 is then maneuvered into sealing engagement with the corresponding tapered portion of receiver passageway 22. The assembly is completed by sliding retainer 36 along first line 32 until retainer 36 is in sealing engagement with the receiver passageway 22 and the portion of boot 16 which tapers towards the first tool portion is in sealing engagement with the corresponding tapered portion of retainer passageway 38.

During operation of down hole tool 10, the sealing engagement between boot 16 and receiver 18 as well as the sealing engagement of coupler 26 resist the penetration of the down hole environment into second tool portion 12. As discussed above, the retainer 36 may be used to enhance a preload of the sealing force between boot 16 and receiver 18 as well as the sealing force between coupler 26 and boot 16. Additional sealing is provided by the sealing engagement of retainer 36 with boot 16 and receiver passageway 22 as well as the sealing engagement of throttle 46 with first line 30.

Moreover, in certain down hole environments, ambient pressure may increase significantly above atmospheric pressure. Note that boot 16 is configured such that increased ambient pressure may result in additional compression of boot 16 which may, in turn, increase the sealing force at each of the aforementioned seals thereby further enhancing the function of sealing connector 14.

Figure 4:
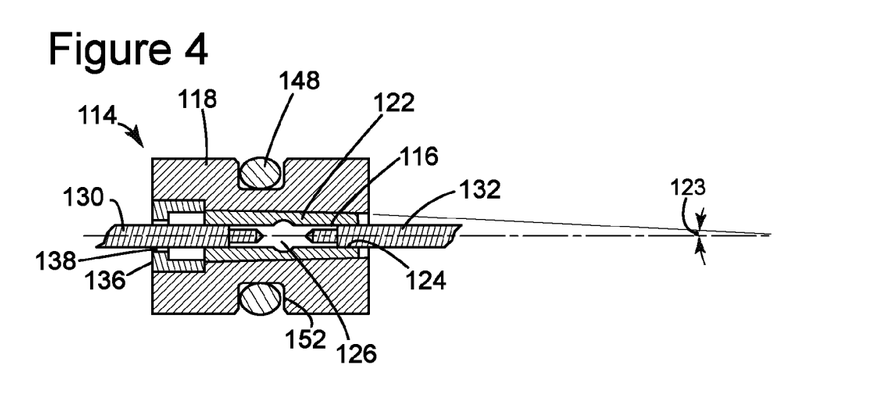
FIG. 4 is a cross-sectional view of a flexible sealing connector according to another exemplary embodiment.

FIG. 4 shows another exemplary embodiment. Connector 114 may include a receiver 118 which is a discrete component separable from the down hole tool 10. Note that connector 114 may be provided as a retrofit for the previously discussed connector 714 shown in FIG. 11. Receiver 118 includes an O-ring 148 and groove 152 which may seal against the side wall 729 of seat 728 of tool portion 720 in FIG. 11. However, receiver 118 may be configured to seal with any part of seat 728 including the bottom 731 thereof. As further shown in FIG. 4, a receiver 118 includes a surface defining a receiver passageway 122 having a single taper defined by angle 123 in FIG. 4 towards the second tool portion (not shown). Also, connector 114 includes a retainer 136 for retaining deformable boot 116 within receiver passageway 122. Receiver 136 is provided with a retainer passageway 138 to accommodate first line 130. First line 130 and second line 132 extend to coupler 126 within boot passageway 124.

Figure 5:
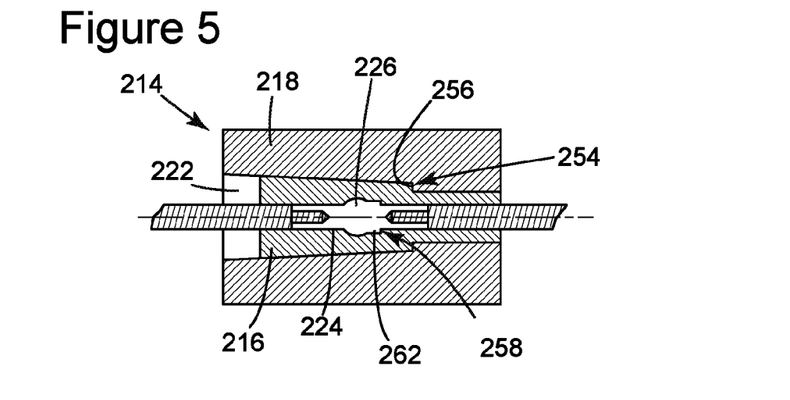
FIG. 5 is a cross-sectional view of a flexible sealing connector according to another exemplary embodiment.

For down hole environments where ambient pressure may be several magnitudes greater than atmospheric pressure, exemplary embodiments may be configured to prevent pressure induced extrusion of the boot or the coupler. FIG. 5 shows a connector 214 including a receiver 218 having a surface defining a receiver passageway 222 having a receiver passageway shoulder 254 and a boot 216 having a boot shoulder 256 engaged with the receiver shoulder. Further, boot passageway 224 includes a surface defining a boot passageway shoulder 258 and coupler 216 includes a coupler shoulder 262. Note that increased ambient pressure acting on connector 214 may increase the sealing force between the surface of receiver passageway 222 and boot 216 and between the surface of boot passageway 224 and coupler 226. However, even in the presence of significant ambient pressure against connector 214, excessive movement of boot 216 and coupler 226 will be resisted by shoulder 262.

Figure 6:
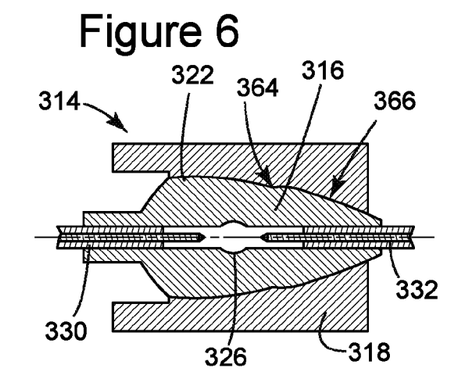
FIG. 6 is a cross-sectional view of a flexible sealing connector according to another exemplary embodiment.
Figure 7:
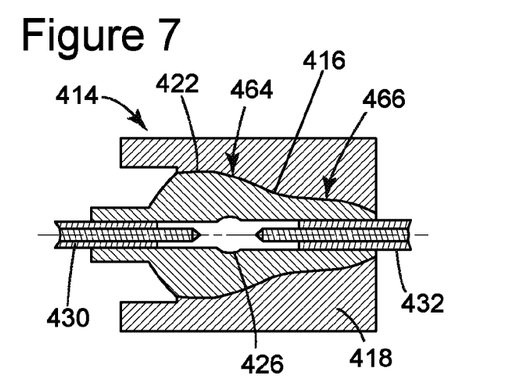
FIG. 7 is a cross-sectional view of a flexible sealing connector according to another exemplary embodiment.

FIGS. 6 to 9 show further exemplary embodiments. In FIG. 6, receiver passageway 322 and boot 316 include a first taper 364 having a smaller cone angle than a second taper 366. In FIG. 7, receiver passageway 422 and boot 416 include a first taper 464 having a larger cone angle than a second taper 466. Employing first and second tapers may provide increased resistance to the aforementioned ambient pressure induced extrusion of boot 316 or 416 from receiver passageway 322 or 422, respectively. Moreover, implementing a second taper that is different than the first taper may allow focusing or aiming of the sealing forces from the boot to the coupler or the electrical lines thereby improving sealing and rigidity. In other exemplary embodiments the first taper or the second taper of the boot may be different than the first or second taper of the receiver passageway thereby providing a configuration where initial sealing contact is made between the first taper or the second taper. Then, as ambient pressure rises and the boot is caused to deform, the remaining taper may engage the receiver passageway thereby providing multi-stage sealing engagement of the boot to the receiver passageway.

Figure 8:
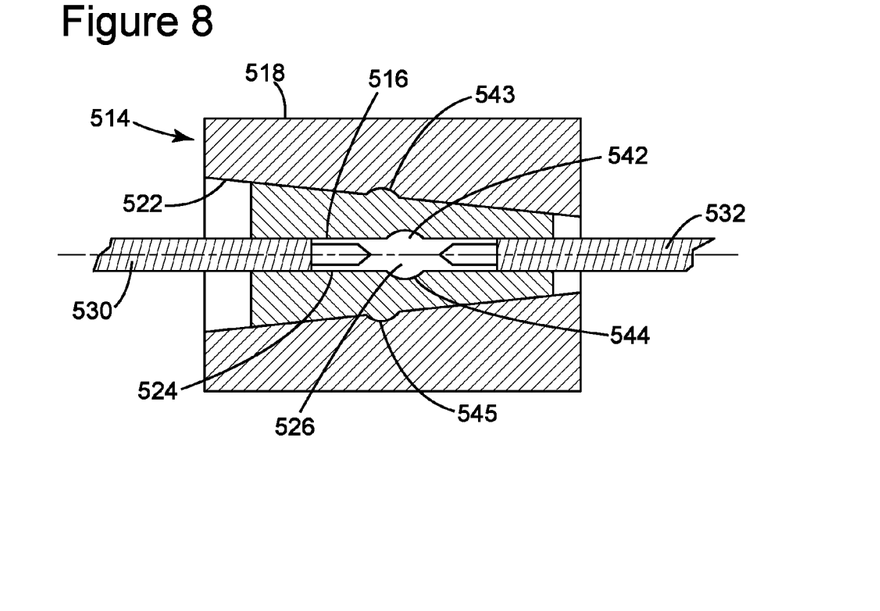
FIG. 8 is a cross-sectional view of a flexible sealing connector according to another exemplary embodiment.

In FIG. 8, coupler 526 includes a ridge 542 in sealing engagement with groove 544 in boot passageway 524. Also, boot 516 includes a ridge 543 in sealing engagement with groove 545 in receiver passageway 522. In the embodiment of FIG. 8, ridge 543 and groove 545 are slightly offset from ridge 542 and groove 544. However, in other embodiments, ridge 543 and groove 545 may define a first plane that is normal to the longitudinal axis of connector 514 and further, ridge 542 and groove 544 may define a second plane coincident with the first plane. Also, the shape or size or ridge 543 and groove 545 may differ from the shape or size of ridge 542 and groove 544.

Ridge 543 and groove 545 may deter movement and enhance the seal between coupler boot 516 and receiver 518. Moreover, during assembly of connector 514, the engagement of ridge 543 with groove 545 may provide a tactile indication that the sealing engagement of boot 516 with receiver 518 is complete.

Figure 9:
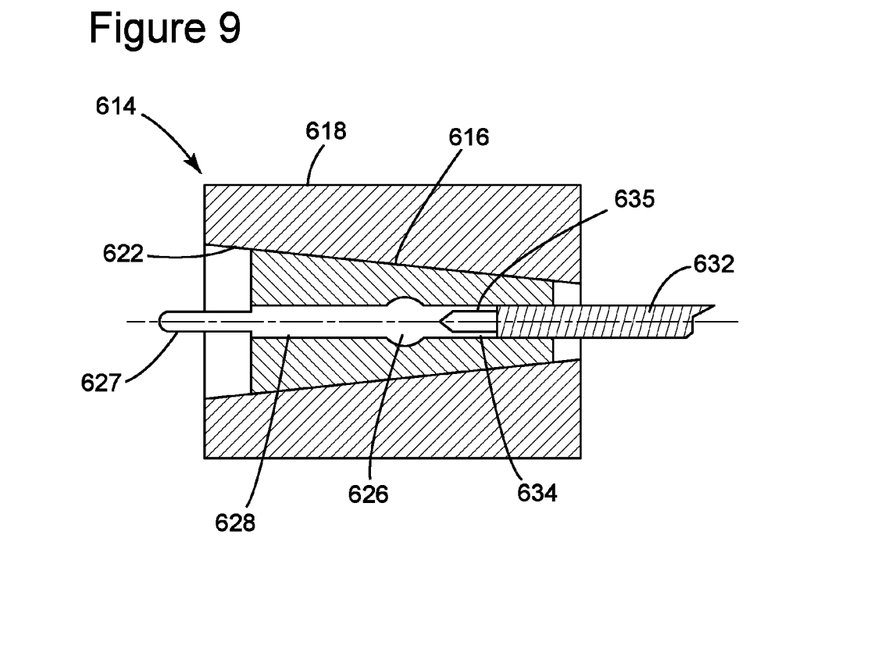
FIG. 9 is a cross-sectional view of a flexible sealing connector according to another exemplary embodiment.

In the exemplary embodiment of FIG. 9, connector 614 includes a coupler 626 having a first end 628 configured with a pin 627 for connection to a first electrical line (not shown) extending from the first tool portion (not shown). Note that only a portion of the pin 627 extends beyond the end of receiver passageway 622. In alternative embodiments, pin 627 may be fully recessed or terminate at the end of receiver passageway 622 to provide additional protection to pin 627 and to the connection with the first electrical line. The second end 634 of coupler 626 includes a socket 635 in which a stripped end portion of the second electrical line 632 is soldered or crimped. In alternative embodiments, either or both of the first end 628 and the second end 634 of coupler 626 may be configured with a pin or other type of connector thereby rendering the assembly of connector 614 even more convenient.

Figure 10:
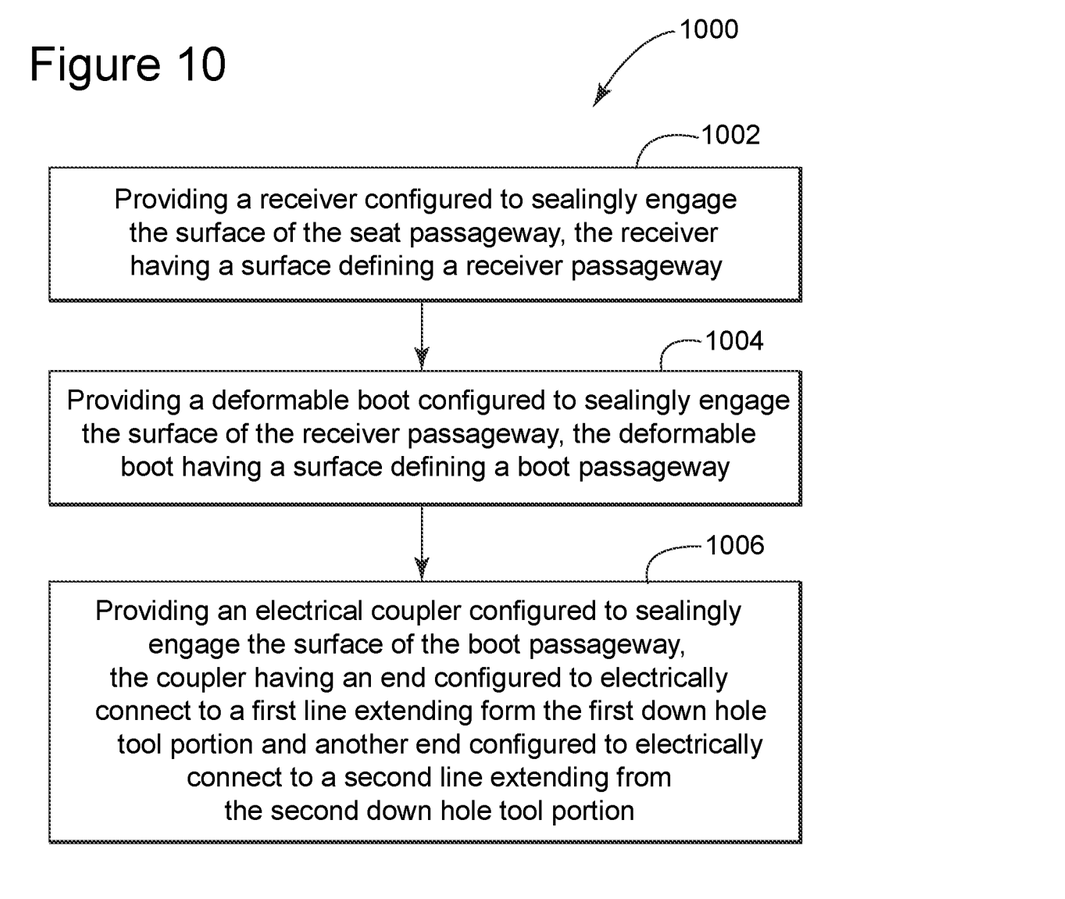
FIG. 10 shows a method according to an exemplary embodiment.

As mentioned above in the context of FIG. 4, embodiments contemplate retrofitting of existing devices. For example, the device of FIG. 11 can be retrofitted with elements from the embodiment of FIG. 4 using the method illustrated in the flowchart of FIG. 10. Therein, a method (1000) of providing a retrofit for a sealed electrical connector between a first down hole tool portion and a second down hole tool portion, at least one of the first down hole tool portion and the second down hole portion including a seat 728 (FIG. 11) having a surface defining a seat passageway 719 (FIG. 11) between the first down hole tool portion and the second down hole portion, can include the steps of providing (1002) a receiver 118 (FIG. 4) configured to sealingly engage the surface of the seat passageway, the receiver having a surface defining a receiver passageway 122 (FIG. 4); providing (1004) a deformable boot 116 (FIG. 4) configured to sealingly engage the surface of the receiver passageway 122 (FIG. 4), the deformable boot having a surface defining a boot passageway 124 (FIG. 4); and providing (1006) an electrical coupler 126 (FIG. 4) configured to sealingly engage the surface of the boot passageway 124 (FIG. 4), the coupler having an end configured to electrically connect to a first line 130 (FIG. 4) extending from the first down hole tool portion and another end configured to electrically connect to a second line 132 (FIG. 4) extending from the second down hole tool portion.

The above-described embodiments are intended to be illustrative in all respects, rather than restrictive, of the present invention. All such variations and modifications are considered to be within the scope and spirit of the present invention as defined by the following claims. No element, act, or instruction used in the description of the present application should be construed as critical or essential to the invention unless explicitly described as such. Also, as used herein, the article "a" is intended to include one or more items.

What is claimed is:

1. A flexible sealing connector for conveying an electrical signal from a first tool portion to a second tool portion, at least one of the first tool portion and the second tool portion having a receiver with a surface defining a receiver passageway, comprising:
 a deformable boot in sealing engagement with the surface of the receiver passageway, said deformable boot having a surface defining a boot passageway, wherein said surface of said receiver passageway said boot taper towards said second tool portion and wherein said service of said boot tapers towards said first tool portion; and
 an electrical coupler in sealing engagement with said surface of said boot passageway, said coupler having a first end electrically connected to a first electrical line extending from said first tool portion and a second end electrically connected to a second electrical line extending from said second tool portion whereby said first line and said second line are electrically connected, said receiver passageway is sealed by said boot and said boot passageway is sealed by said coupler.

2. The connector of claim 1 wherein at least one of said first end and said second end of said coupler includes one of a pin and a socket for providing said electrical connection.

3. The connector of claim 2 wherein said surface of said boot passageway defines a groove and said coupler includes a ridge in sealing engagement with said groove.

4. The connector of claim 3 wherein said surface of said receiver passageway defines a groove and said boot includes a ridge in sealing engagement with said groove.

5. The connector of claim 3 further comprising a retainer retaining said boot in sealing engagement with said receiver.

6. The connector of claim 5 wherein said retainer is in sealing engagement with said receiver passageway, said retainer has a surface defining a retainer passageway, and said boot is in sealing engagement with said surface of said retainer passageway.

7. The connector of claim 6 wherein said ridge and said groove are disposed between said taper of said boot towards said first tool portion and said taper of said boot towards said second tool portion.

8. The connector of claim 1 wherein said first line extends from said first tool portion into said boot passageway to said first end of said coupler and said second line extends from said second tool portion into said boot passageway to said second end of said coupler.

9. The connector of claim 8 wherein said surface of said boot passageway engages at least one of said first line and said second line thereby providing strain relief to said coupler.

10. The connector of claim 9 wherein said surface of said boot passageway defines at least one throttle portion in sealing engagement with at least one of said first line and said second line.

11. The connector of claim 10 wherein said receiver passageway and said boot are configured to resist pressure induced extrusion of said boot from said receiver passageway.

12. The connector of claim 11 wherein said surface of said receiver passageway defines a receiver passageway shoulder and said boot includes a boot shoulder engaged with said receiver passageway shoulder.

13. The connector of claim 10 wherein said boot passageway and said coupler are configured to prevent ambient pressure induced extrusion of said coupler from said boot passageway.

14. The connector of claim 13 wherein said surface of said boot passageway defines a boot passageway shoulder and said coupler includes a coupler shoulder engaged with said boot passageway shoulder.

15. The connector of claim 1 wherein said taper of said boot and said receiver passageway towards said second tool portion comprises a first taper and at least a second taper different from said first taper.

16. A sealed electrical connector assembly for a well logging tool, comprising:
 a first tool portion including a first electrical line extending from an end thereof;
 a second tool portion including a second electrical line extending from an end thereof;
 said at least one of said first and second tool portions including a seat, said seat having a surface defining a seat passageway;
 a receiver in sealing engagement with said surface of said seat passageway, said receiver having a surface defining a receiver passageway;
 a deformable boot in sealing engagement with said surface of said receiver passageway, said deformable boot having a surface defining a boot passageway, wherein said surface of said receiver passageway and said boot taper towards said second tool portion and wherein said boot also tapers towards said first tool portion; and
 an electrical coupler in sealing engagement with said surface of said boot passageway, said coupler having a first end electrically connected to said first electrical line and a second end electrically connected to said second electrical line whereby said first line and said second line are electrically connected, said seat passageway is sealed by said receiver, said receiver passageway is sealed by said boot and said boot passageway is sealed by said coupler.

* * * * *